A. A. TIRRILL.
ELECTRICAL REGULATOR.
APPLICATION FILED MAR. 3, 1914.

1,216,888.

Patented Feb. 20, 1917.

WITNESSES:

INVENTOR
Allen A. Tirrill
BY
ATTORNEY

UNITED STATES PATENT OFFICE.

ALLEN A. TIRRILL, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL REGULATOR.

1,216,888.

Specification of Letters Patent.

Patented Feb. 20, 1917.

Application filed March 3, 1914. Serial No. 822,134.

*To all whom it may concern:*

Be it known that I, ALLEN A. TIRRILL, a citizen of the United States, and a resident of Pittsburgh, in the county of Allegheny and State of Pennsylvania, have invented a new and useful Improvement in Electrical Regulators, of which the following is a specification.

My invention relates to electrical regulators and particularly to those in which the regulation is effected by opening and closing a shunt circuit to a resistance in series with the field magnet winding of an exciter or other dynamo-electric machine.

The object of my invention is to provide a regulator of the character indicated that shall be effective and reliable in operation, and capable of maintaining the voltage or other electrical quantity of a circuit substantially constant in value and of promptly and accurately restoring it to its normal value following a change of load upon, or other disturbance of, a system.

Figure 1:
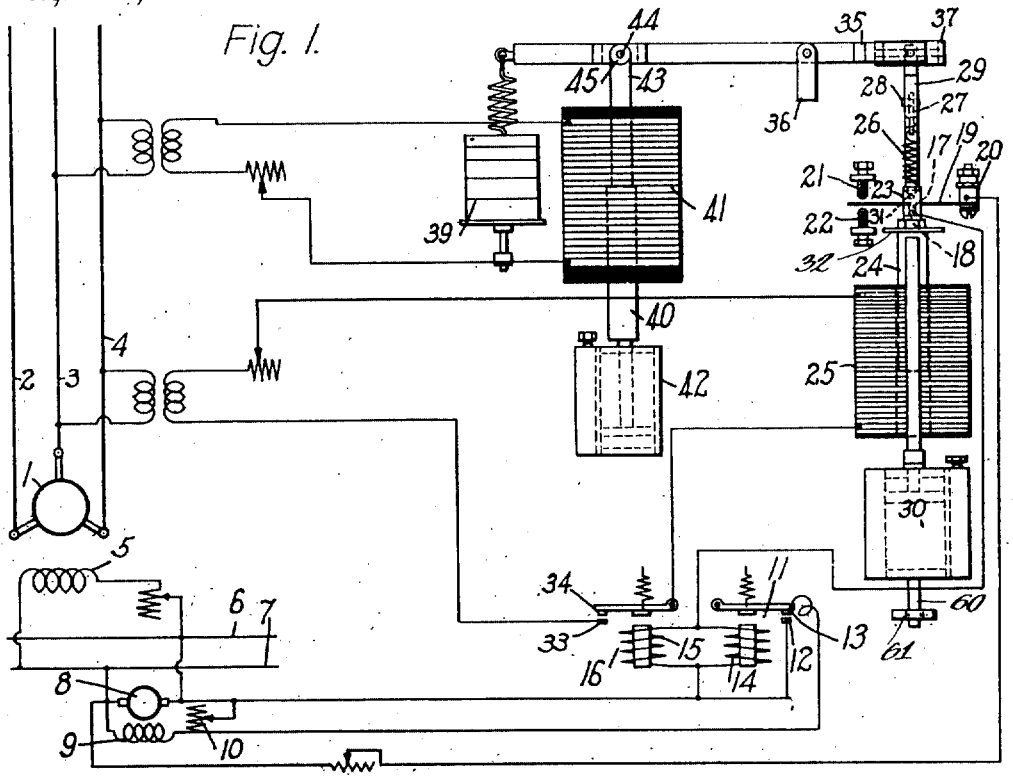
Figure 3:
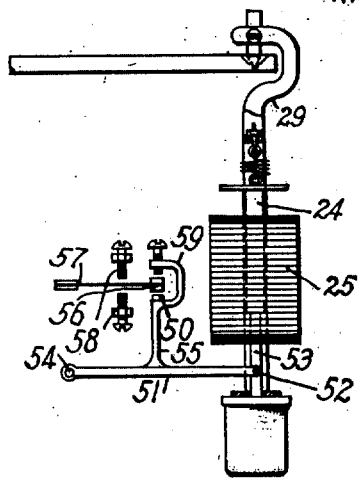
Figure 2:
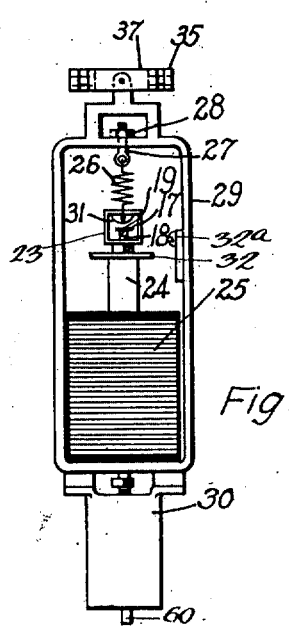
Figure 4:
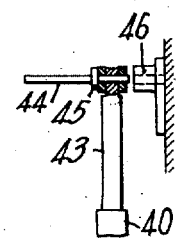

My invention is illustrated in the accompanying drawing, Figure 1 of which is a side view of the main controlling element of the regulator, the circuit connections being illustrated diagrammatically. Fig. 2 is an end view of the main controlling element of the regulator, and Fig. 3 is a side view of a modification of one of the parts of the regulator of Fig. 1. Fig. 4 is an enlarged view showing in detail the construction of one of the pivot pins of the regulator.

A system in connection with which the regulator may be conveniently employed comprises a generator 1 that supplies current to a suitable distributing circuit 2—3—4 and the field magnet winding 5 of which is supplied from exciter bus bars 6—7. An exciter 8 that is connected to the bus bars 6—7 is provided with a field magnet winding 9 in series with which is a suitable variable resistor 10, the effective value of which is determined by opening and closing a shunt circuit thereto by means of a relay 11 having coöperating stationary and movable members 12 and 13, respectively, that are connected to the terminals of the resistor 10. The relay 11 is provided with an energizing winding 14 that is connected in parallel with an energizing winding 15 of a similar relay 16, both of said windings being supplied with current from the exciter or from any other suitable source.

The circuit of the windings 14 and 15 is controlled by a pair of coöperating contact terminals 17 and 18, the former of which is mounted upon a plate spring 19 intermediate its ends. One end of the spring 19 is clamped in a stationary post 20, and the other end extends between two screws 21 and 22, serving as adjustable means for limiting the movements of the contact terminal 17. The contact terminal 18 is mounted upon the upper face of the lower cross-piece of a small yoke 23 that is carried by the core member 24 of an electro-magnet having an energizing winding 25. The upper end or cross-piece of the yoke is connected to the lower end of a helical tension spring 26, the upper end of which is connected to an eye bolt 27 having a nut 28 for adjusting the tension of the spring. The eye-bolt 27 passes through the upper end of a rectangular frame 29 that surrounds and supports the electromagnet 25 and its associated parts. The movements of the solenoid core 24 and of the contact member 18 are retarded by means of a dash pot 30 that is secured to the lower end of the frame 29, and their movements are also limited by reason of the engagement of a boss or projection 31, that is provided upon the lower face of the upper cross-piece of the yoke 23, with the upper face of the plate spring 19 that carries the contact terminal 17. The coil 25 receives current from the distributing circuit 2—3—4, though it may receive current from any other suitable source, and its circuit is controlled by coöperating stationary and movable contact terminals 33 and 34, respectively, of the relay 16. The frame 29 is steadied or guided by a guide pin 60 attached to the bottom of the dash pot 30 and an apertured member 61 in which the pin operates.

Upon the upper end of the core member 24 is a laterally extending cap or end piece 32, and, secured to one side of the frame 29 adjacent to the said end piece is a magnetizable plate 32ᵃ that is adjustable vertically of the frame to vary its effect upon the core member. When the coil 25 is energized, the core 24 is attracted slightly toward the plate, and the contact terminals 17 and 18 are brought together with a rubbing action, thereby insuring good electrical contact between them and keeping them clean.

The frame 29 is suspended from a lever 35 that is fulcrumed in a stationary bracket 36, the said lever and frame being operatively connected by means of a universal joint comprising a yoke 37 that is pivotally connected both to the lever 35 and to the upper end of the frame 29, the pivotal axes intersecting each other at substantially right angles. The object of employing a universal joint is to permit of free suspension of the frame 29 and the parts carried thereby, in order that binding of joints and consequent friction and inaccuracy of operation, may be avoided.

The end of the lever 35 opposite to that to which the frame 29 is connected carries an adjustable counterweight 39, that is resiliently suspended therefrom, and the core member 40 of an electromagnet having an energizing winding 41, the movements of the said lever and associated parts being retarded by means of a dash pot 42. The coil 41 receives current proportional to the voltage of the distributing circuit 2—3—4, and, accordingly, varies the positions of the lever 35 and of the frame 29 in accordance with the said voltage. However, if desired, the coil 41 may be caused to vary the positions of said parts in accordance with any other desired electrical condition. In thus varying the position of the frame 29, the position of the contact terminal 18 with respect to the terminal 17 is likewise varied, so that the initial distance between the said contact terminals, that is, the distance which would exist between them, if the winding 25 were not energized, is varied in accordance with the voltage or other selected electrical condition of the distributing circuit.

The core member 40 for the solenoid 41 is suspended from the lever 35 by means of a non-magnetizable rod 43 having an aperture in its upper end to receive a pivot pin 44 that is provided with a washer or shoulder 45 located somewhat nearer one end than the other. Behind the lever 35 adjacent to the pivotal connection between the said lever and the rod 43, is a bracket 46 that is apertured to receive the pivot pin 44. During normal operation of the regulator, the pivot pin 44 occupies the position shown in Fig. 4, but in order to facilitate adjustment of the regulator prior to placing it in operation, the pivot pin 44 is withdrawn and its longer end inserted through the lever 35 and into the aperture in the bracket 46. The position of the lever 35 is thereby fixed and the adjustment of the spring 26, of the stops 21 and 22, and of the other parts of the regulator carried by the frame 29, may be readily effected.

If, in the operation of the regulator, the load upon the circuit 2—3—4 increases to such an amount as to cause the voltage of the circuit to decrease, the coil 41 will be energized to a somewhat less degree, and the frame 29 will consequently be raised slightly, with the result that the contact terminal 18 will be brought closer to, or into engagement with, the terminal 17. Upon engagement of the said contact terminals, the circuit of the relay windings 14 and 15 is established, and the contact terminals of the relays are caused to engage. Engagement of the contact terminals 12 and 13 establishes a shunt to the resistor 10, and the voltages of the exciter and generator are correspondingly increased to compensate for the decreased voltage resulting from the increase of load. Engagement of the contact terminals 33 and 34 establishes the circuit of the coil 25, which thereupon attracts its core 24 and causes separation of the contact terminals 17 and 18. Upon the interruption of the circuit of the coils 14 and 15, which is thus effected, the contact terminals of the relays disengage and the shunt circuit is again established to the resistor 10, while the circuit of the coil 25 is again interrupted.

The coil 25 is thus alternately energized and deënergized and serves to vibrate the contact terminals 17 and 18 into and out of engagement, while the coil 41 serves to vary the position of the contact terminal 18 with respect to the terminal 17 so that the said terminals will engage and disengage for varying periods dependent upon the voltage of the circuit 2—3—4. The arrangement is such that the resistor 10 is shunted for a greater average period when there is a tendency for the voltage of the circuit 2—3—4 to be reduced, and for a shorter average period when the tendency is toward a higher voltage, with the result that the voltage of the distributing circuit is maintained substantially uniform.

The boss or projection 31 coöperates with the spring 19 to limit relative movements of the contact terminals 17 and 18 for the purpose of permitting of readily cutting the regulator into and out of service. Cutting the regulator out of service is accomplished by decreasing the actual value of the resistance 10 in the exciter field circuit, as the said resistance normally has an actual value in excess of that which would cause the generator to assume its normal voltage if no regulator were employed. This is because the effective value of the said resistance is determined by opening and closing a shunt circuit thereto, and is accordingly less than its actual value. In order to cut the regulator out of service, the actual value of the said resistance should be reduced to correspond with its effective value when the generator voltage is normal.

The effect of reducing the actual value of the resistance 10 is to cause a tendency of both the exciter and generator voltages to increase, the actual increase, however, being very slight because the regulator contact members continue to vibrate into and out of engagement until the actual and effective values of the resistance 10 correspond. On account of the tendency of the generator voltage to increase, the coil 41 tends to cause the contact members 17 and 18 to separate, with the result that the periods of disengagement of said members become longer than the periods of engagement, and also that the relay contact members 12—13 and 33—34 engage for shorter periods. The coil 25 is, consequently, energized for shorter periods, and the spring 26 tends to cause the contact member 18 to engage the member 17. As the resistance 10 is further reduced in value, the frame 29 is lowered to such an extent that the projection or boss 31 engages the upper face of the spring 19, and the free end of the spring is caused to engage the stop screw 22, with the result that the contact terminals 17 and 18 are maintained out of engagement. The coil 25 cannot then be energized, and the regulator ceases to operate. It may then be cut out of service.

In the modification shown in Fig. 3, the movable contact member 50 is carried by a lever 51 that is pivotally connected at 52 to a rod 53 constituting an extension of the core 24 of the coil 25. The other end of the lever 51 is fulcrumed to a stationary support 54, and the lever is provided with an upwardly extending arm 55 upon which the movable contact member 50 is mounted. The movable contact member 50 is adapted to enage a stationary contact member 56 that is resiliently mounted upon the free end of a plate spring 57, the movements of which are limited by means of stop screws 58. The arm 55 of the lever is also provided with an extension 59 that is adapted to engage the upper face of the plate spring 57 to serve the same function as the boss or projection 31 in the regulator of the preceding figures, that is, to permit of readily cutting the regulator into and out of service. The lever 51 serves to steady or guide the core member 24 and the frame 29, and, by reason of the provision of the upwardly extending arm 55, the contact terminals 50 and 56 are caused to engage with a rubbing action that insures good contact between them, and maintains them in clean condition.

I claim as my invention:

1. An electrical regulator comprising cooperating contact members, a lever, means for actuating the lever, a frame pivotally suspended from the lever, means for guiding the movements of said frame, and an electromagnet carried by said frame for actuating one of said contact members.

2. An electrical regulator comprising cooperating contact members, a lever, means for actuating the lever, and an electromagnet for actuating one of said contact members the said electromagnet being pivotally suspended from the lever.

3. An electrical regulator comprising cooperating contact members, a lever, means for actuating the lever, an electromagnet for actuating one of said contact members, and a universal joint connecting said electromagnet to said lever.

4. An electrical regulator comprising cooperating contact members, an electromagnetic actuator for one of the members, means for guiding the movements of said actuator, a lever from which the said actuator is pivotally suspended, and means for actuating the said lever.

5. An electrical regulator comprising cooperating contact members, an electromagnetic actuator for one of the members, a lever from which the said actuator is suspended, means for actuating the said lever, and a universal joint operatively connecting the said actuator to said lever.

6. An electrical regulator comprising cooperating contact members one of which is resiliently mounted, means for limiting the movements of the resiliently mounted contact member, an electromagnetic actuator for the other contact member, a lever from which the said actuator is pivotally suspended, and means for actuating the said lever.

7. An electrical regulator comprising cooperating contact members one of which is resiliently mounted, means for limiting the movements of the said resiliently mounted member, an electromagnetic actuator for the other contact member, means associated with said actuator for assisting in further limiting relative movements of the said contact members, a lever from which the said actuator is pivotally suspended, and means for actuating the said lever.

8. An electrical regulator comprising cooperating contact members, a lever, means for actuating the same, a frame pivotally suspended from the lever, an electromagnet carried by said frame for actuating one of said contact members, said electromagnet having a resiliently supported core member.

9. An electrical regulator comprising cooperating contact members, a lever, means for actuating the lever, a frame pivotally suspended from the lever, an electromagnet carried by said frame for actuating one of said contact members, said electromagnet having a resiliently supported core member, and means associated with said core member for limiting relative movements of said contact members.

10. An electrical regulator comprising cooperating contact members, a bell-crank lever carrying one of said contact members, an electromagnet for actuating said lever, another lever from which the said electromagnet is pivotally suspended, and means for actuating the latter lever.

In testimony whereof, I have hereunto subscribed my name this 27th day of Feb. 1914.

ALLEN A. TIRRILL.

Witnesses:
OTTO S. SCHAIRER,
B. B. HINES.